(12) United States Patent
Yin et al.

(10) Patent No.: US 11,573,148 B2
(45) Date of Patent: Feb. 7, 2023

(54) LEAKAGE DETECTION IN CONDENSING WATER HEATER

(71) Applicant: A. O. SMITH CORPORATION, Milwaukee, WI (US)

(72) Inventors: Jianmin Yin, Menomonee Falls, WI (US); Matthew W. Critchley, Milwaukee, WI (US); Quinn Thomas Keller, Aberdeen, NC (US)

(73) Assignee: A. O. Smith Corporation, Milwaukee, WI (US)

( * ) Notice: Subject to any disclaimer, the term of this patent is extended or adjusted under 35 U.S.C. 154(b) by 305 days.

(21) Appl. No.: 16/538,514

(22) Filed: Aug. 12, 2019

(65) Prior Publication Data

US 2021/0048364 A1    Feb. 18, 2021

(51) Int. Cl.
*G01M 3/00* (2006.01)
*E03B 7/07* (2006.01)
*F24H 9/20* (2022.01)

(52) U.S. Cl.
CPC ............. *G01M 3/002* (2013.01); *E03B 7/071* (2013.01); *F24H 9/2035* (2013.01); *F24H 2210/00* (2013.01)

(58) Field of Classification Search
CPC .......... G01M 3/002; F24H 1/16; F24H 1/165; F24H 1/445; F24H 9/20–2057;
(Continued)

(56) References Cited

U.S. PATENT DOCUMENTS 4,672,842 A * 6/1987 Hasselmann ........... G01F 1/007
374/115
5,323,620 A * 6/1994 Wood ...................... F24F 13/22
62/188
(Continued)

FOREIGN PATENT DOCUMENTS

CN      104075453 A    10/2014
DE         4134230 A1     4/1992
(Continued)

OTHER PUBLICATIONS

Extended European Search Report for Application No. 20189793.1 dated Dec. 10, 2020 (6 pages).

*Primary Examiner* — Edelmira Bosques
*Assistant Examiner* — Michael James Giordano
(74) *Attorney, Agent, or Firm* — Michael Best & Friedrich LLP

(57) ABSTRACT

A water heater system includes a gas burner configured to selectively produce flue gases, and a heat exchanger for heating water in the water heater system. The water heater system is operable in a heating mode, and a standby mode. An exhaust assembly is in communication with the heat exchanger, and includes a condensate collector configured to receive the flue gases and condensate. A first temperature sensor is positioned to sense a temperature of the condensate within the condensate collector. The first temperature sensor is configured to detect a rate of temperature change of the condensate. A controller is configured to determine a leakage when the rate of temperature change adjusts from a first state to a second state when the water heater system is in the standby mode after the water heater system was in the heating mode.

19 Claims, 10 Drawing Sheets

(58) Field of Classification Search
CPC ........ F24H 2210/00; F24H 8/00; F24H 8/006;
F28F 2265/16; F28F 27/00; F28F 17/005;
E03B 7/071; G01F 23/246–248
USPC .............................................. 122/504, 504.2
See application file for complete search history.

(56) References Cited

U.S. PATENT DOCUMENTS

| | | | |
|---|---|---|---|
| 7,076,373 B1 * | 7/2006 | Munsterhuis | F24H 9/2007 |
| | | | 702/51 |
| 2018/0216849 A1 | 8/2018 | Deivasigamani et al. | |
| 2018/0224156 A1 * | 8/2018 | Steinhafel | F24H 9/2035 |

FOREIGN PATENT DOCUMENTS

| | | | | |
|---|---|---|---|---|
| DE | 10111073 A1 | 10/2002 | | |
| EP | 1734316 A2 | 12/2006 | | |
| EP | 1775535 A1 | 4/2007 | | |
| GB | 1486418 A * | 9/1977 | ................ | G01P 5/12 |
| JP | 2001041579 A * | 2/2001 | | |
| JP | 5019861 B2 | 9/2012 | | |
| KR | 200176950 Y1 * | 4/2000 | | |
| KR | 100559249 B1 | 3/2006 | | |
| WO | 2012123301 A1 | 9/2012 | | |
| WO | WO-2015194785 A1 * | 12/2015 | ................ | F24H 8/00 |

\* cited by examiner

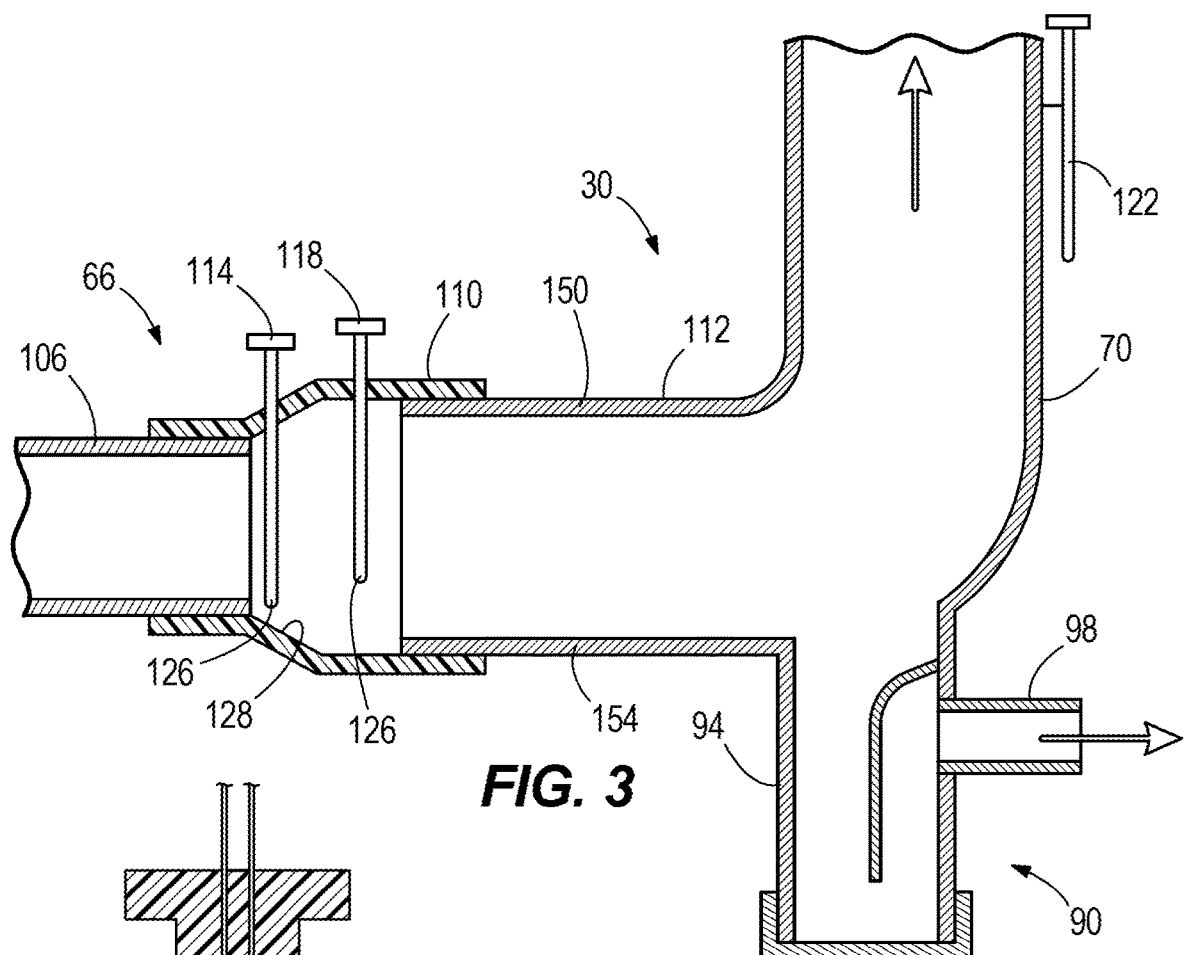
*FIG. 3*
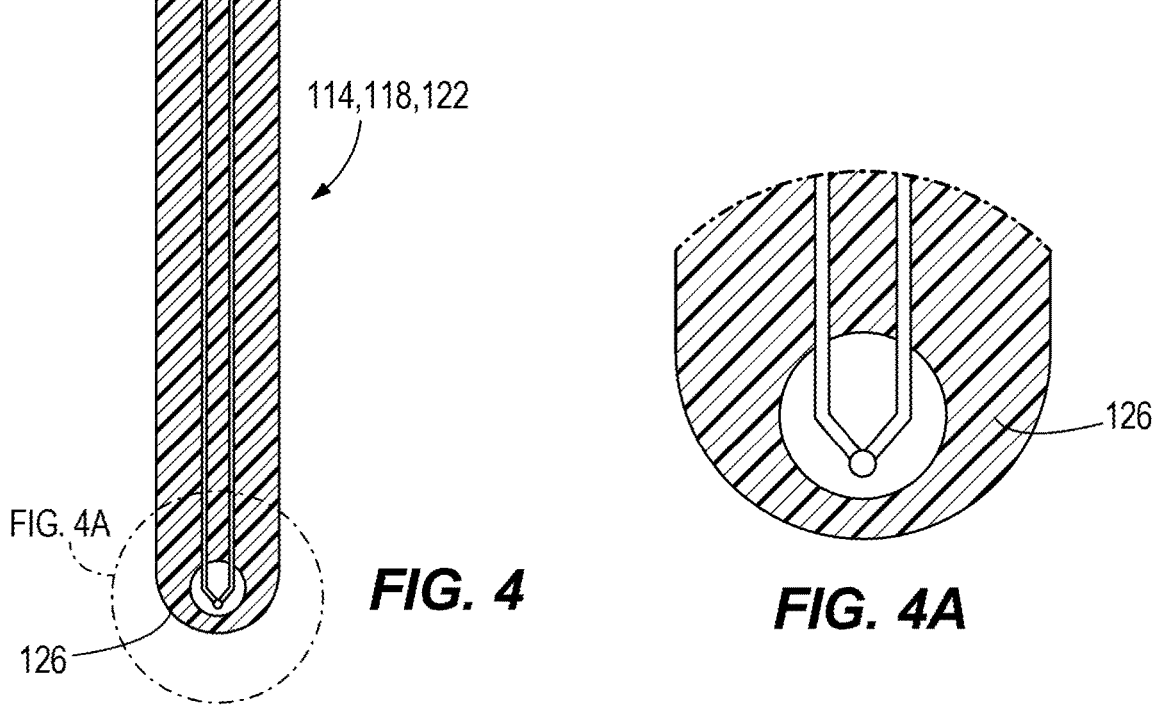
*FIG. 4*
*FIG. 4A*

LEAKAGE DETECTION IN CONDENSING WATER HEATER

BACKGROUND

Generally, water heaters fall into one of two types: (i) tankless or instantaneous water heaters, and (ii) storage or tank water heaters. Each type of water heater may further use hot flue gases produced by a gas burner for heating the water. This type of water heater may be termed as a condensing water heater. The present invention relates to a control system configured to determine whether an error has occurred within a condensing water heater.

SUMMARY

One aspect of the invention provides a water heater system including a gas burner configured to selectively produce flue gases, and a heat exchanger for heating water in the water heater system. The heat exchanger is configured to receive one of the water and the flue gases. The water heater system is operable in a heating mode in which the flue gases are flowing through the water heater system to heat the water in the water heater system, and a standby mode in which there is an absence of the flue gases flowing through the water heater system. An exhaust assembly is in fluid communication with the heat exchanger. The exhaust assembly includes a condensate collector configured to receive the flue gases and condensate produced by the flue gases. The condensate collector includes a condensate management portion. A first temperature sensor is positioned to sense a temperature of the condensate within the condensate collector. The first temperature sensor is configured to detect a rate of temperature change of the condensate. A controller is configured to determine a leakage of the water heater system when the rate of temperature change adjusts from a first state to a second state when the water heater system is in the standby mode after the water heater system was in the heating mode. The condensate management portion delays the adjustment of the rate of temperature change from the first state to the second state for a predetermined time period when the water heater system enters the standby mode from the heating mode.

In another aspect, the invention provides a method of determining an error in a water heater system. The water heater system includes a heat exchanger, a gas burner, and an exhaust assembly in fluid communication with the heat exchanger. The method includes operating the water heater system in a heating mode, in which flue gases produced by the gas burner are flowing through the water heater system, and operating the water heater system in a standby mode, in which there is an absence of the flue gases flowing through the water heater system. The method further includes condensing the flue gases to form condensate when the water heater system is operating in the heating mode, and flowing the condensate through the exhaust assembly. The method further includes monitoring, by a controller, a rate of temperature change detected by a first temperature sensor positioned to sense a temperature of the condensate within a condensate collector of the exhaust assembly. The condensate collector has a condensate management portion. The method further includes determining a leakage of the water heater system by the controller when the rate of temperature change adjusts from a first state to a second state when the water heater system is in the standby mode after the water heater system was in the heating mode. The method further includes delaying, by the condensate management portion, the adjustment of the rate of temperature change from the first state to the second state for a predetermined time period when the water heater system enters the standby mode from the heating mode.

In yet another aspect, the invention provides a water heater system including a gas burner configured to selectively produce flue gases, and a heat exchanger for heating water in the water heater system. The heat exchanger is configured to receive one of the water and the flue gases. The water heater system is operable in a heating mode in which the flue gases are flowing through the water heater system to heat the water in the water heater system, and a standby mode in which there is an absence of the flue gases flowing through the water heater system. The water heater system further includes an exhaust assembly in fluid communication with the heat exchanger. The exhaust assembly includes a condensate collector configured to receive the flue gases and condensate produced by the flue gases. A first temperature sensor is positioned to sense a temperature of the condensate flowing through the exhaust assembly. A second temperature sensor is positioned to sense a temperature of surrounding atmosphere. A controller is configured to determine a leakage of the water heater system based on a comparison between temperature readings of the first temperature sensor and the second temperature sensor when the water heater is in the standby mode.

In yet still another aspect, the invention provides a method of determining an error in a water heater system. The water heater system includes a heat exchanger, a gas burner, and an exhaust assembly in fluid communication with the heat exchanger. The method includes operating the water heater system in a heating mode, in which flue gases produced by the gas burner are flowing through the water heater system, and operating the water heater system in a standby mode, in which there is an absence of the flue gases flowing through the water heater system. The method further includes condensing the flue gases to form condensate when the water heater system is operating in the heating mode, and flowing the condensate through the exhaust assembly. The method further includes monitoring, by a controller, temperature readings of a first temperature sensor positioned to sense a temperature of the condensate flowing through the exhaust assembly, and a second temperature sensor positioned to sense a temperature of an outside atmosphere. The method further includes determining a leakage of the water heater system by the controller based on a comparison between the temperature readings of the first temperature sensor and the second temperature sensor when the water heater is in the standby mode.

Other aspects of the invention will become apparent by consideration of the detailed description and accompanying drawings.

BRIEF DESCRIPTION OF THE DRAWINGS

FIG. 3 is a cross-sectional view of the intermediate pipe of FIG. 2 taken along lines 3-3 in FIG. 2, illustrating temperature sensors positioned on a top side of the intermediate pipe.

FIG. 4 is a schematic view of one of the temperature sensors of FIG. 3.

FIG. 4A is an enlarged view of the tip of the temperature sensor of FIG. 4.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4". The term "about" may refer to plus or minus 10% of the indicated number. For example, "about 10%" may indicate a range of 9% to 11%, and "about 1%" may mean from 0.9-1.1. Other meanings of "about" may be apparent from the context, such as rounding off, so, for example "about 1" may also mean from 0.5 to 1.4.

Figure 1:
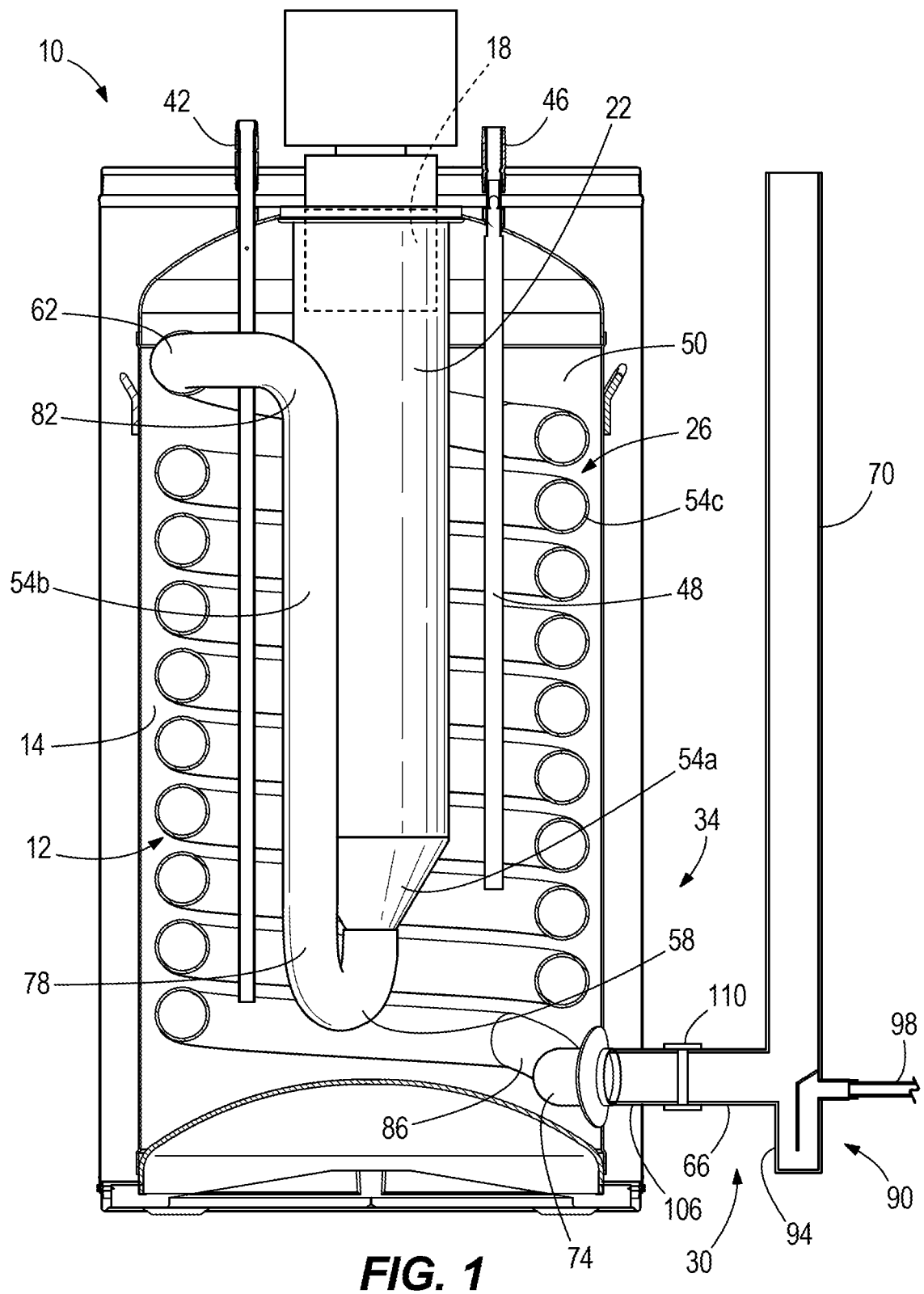
FIG. 1 is a vertical cross-sectional view of a water heater according to a construction of the present invention, the water heater including a heat exchanger and a vent pipe in connection with the heat exchanger.
Figure 7:
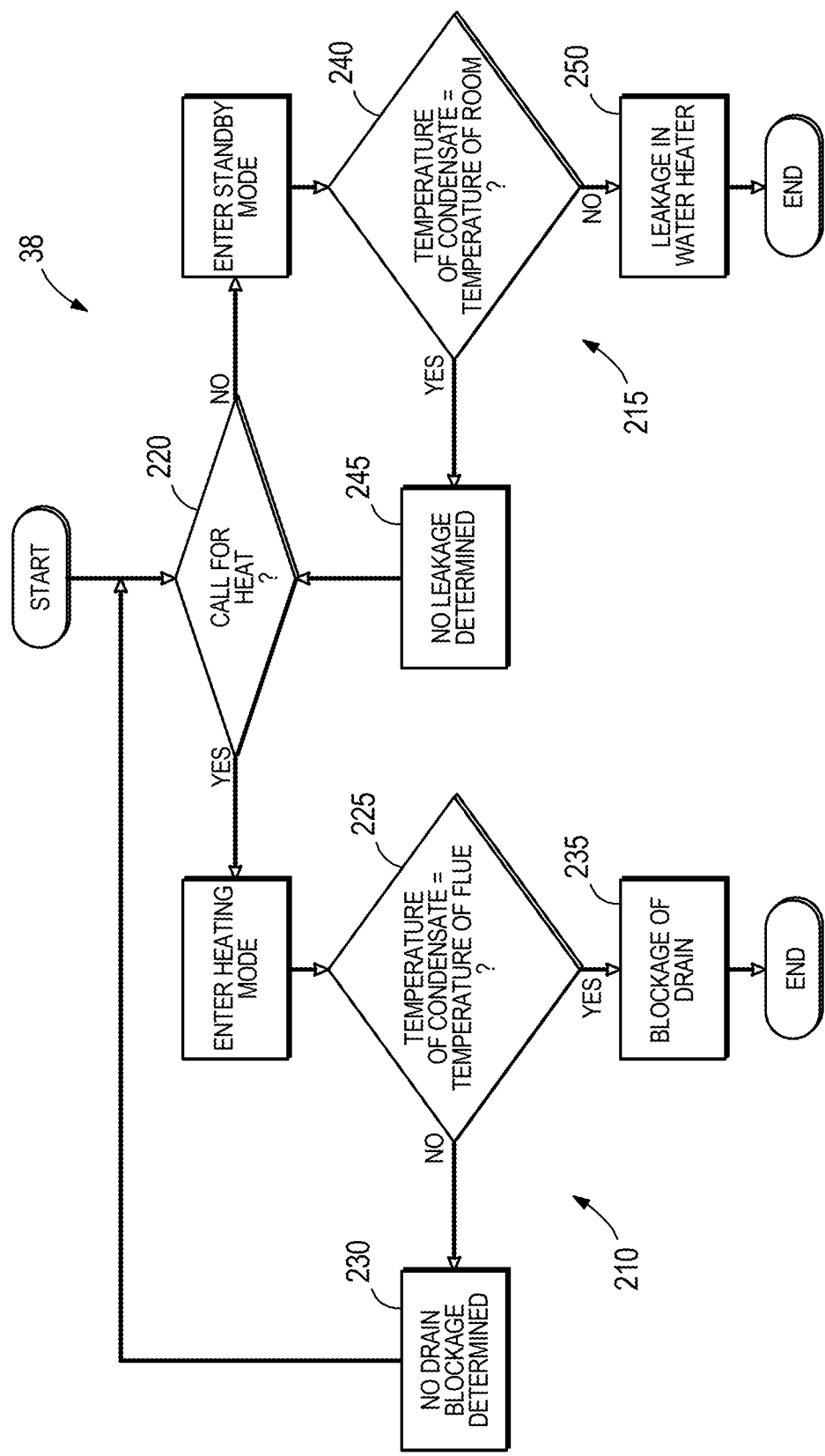
FIG. 7 is a flow diagram illustrating a control system of the water heater of FIG. 1, the control system configured to detect a water leakage and a drain blockage.

FIG. 1 illustrates a water heater 10 including a heat exchanger 12, a tank 14, a gas burner 18, and an exhaust assembly 30. The illustrated heat exchanger 12 includes a combustion chamber 22 and a flue 26. The water heater 10 also includes a flue gas circuit 34 and a control system 38 (FIG. 7).

The tank 14 includes a water inlet 42 for the supply of cold water from a source of water. The tank 14 also includes a water outlet 46 for delivery of hot water from the tank 14 to a hot water consuming device (e.g., faucet, shower, dishwasher, etc.). A sacrificial anode 48 may depend from the water outlet 46 to protect the tank 14 from corrosion. The tank 14 defines an interior space 50 configured to receive the water. A hot water draw occurs when the water is exiting the tank 14 (i.e., through the water outlet 46) and is delivered to the hot water consuming device.

The gas burner 18 burns a combustible mixture of fuel (e.g., natural gas) and air to generate hot flue gases in the combustion chamber 22. The water heater 10 may be defined as being in a heating mode when the gas burner 18 is operating. The water heater 10 may be further defined as being in a standby mode when the gas burner 18 is not operating. There is an absence of flue gases flowing through the water heater 10 when the water heater 10 is in the standby mode.

In the illustrated embodiment, the gas burner 18 is positioned on top of the tank 14, and the combustion chamber 22 extends from the burner 18 into the tank 14. In particular, the burner 18 may extend partially into the combustion chamber 22 through a top of the combustion chamber 22. The illustrated burner 18 fires downwardly into the combustion chamber 22 and may therefore be defined as a down-firing burner. In other embodiments, the gas burner 18 may be positioned at the bottom of the tank 14 and fired upwardly into the combustion chamber 22. The combustion chamber 22 is defined by an upper portion of the flue 26. The combustion chamber 22 and flue 26 are positioned within the interior space 50 defined by the tank 14. The flue gases generated by the gas burner 18 flow through the flue 26. The water within the interior space 50 is heated as the hot flue gases flow through the flue 26. As such, the flue 26, and the combustion chamber 22, may be collectively referred to as the heat exchanger 12 for transferring heat from the flue gases to the water in the tank 14.

With continued reference to FIG. 1, the flue 26 includes a plurality of sections forming the flue 26. In the illustrated embodiment, the flue 26 includes a wider upper section which defines the combustion chamber 22, a narrowing section 54a, a vertical section or riser 54b, and a coil section 54c. The narrowing section 54a and the vertical section 54b are connected by a first elbow 58. The vertical section 54b and the coil section 54c are connected by a second elbow 62.

Figure 2:
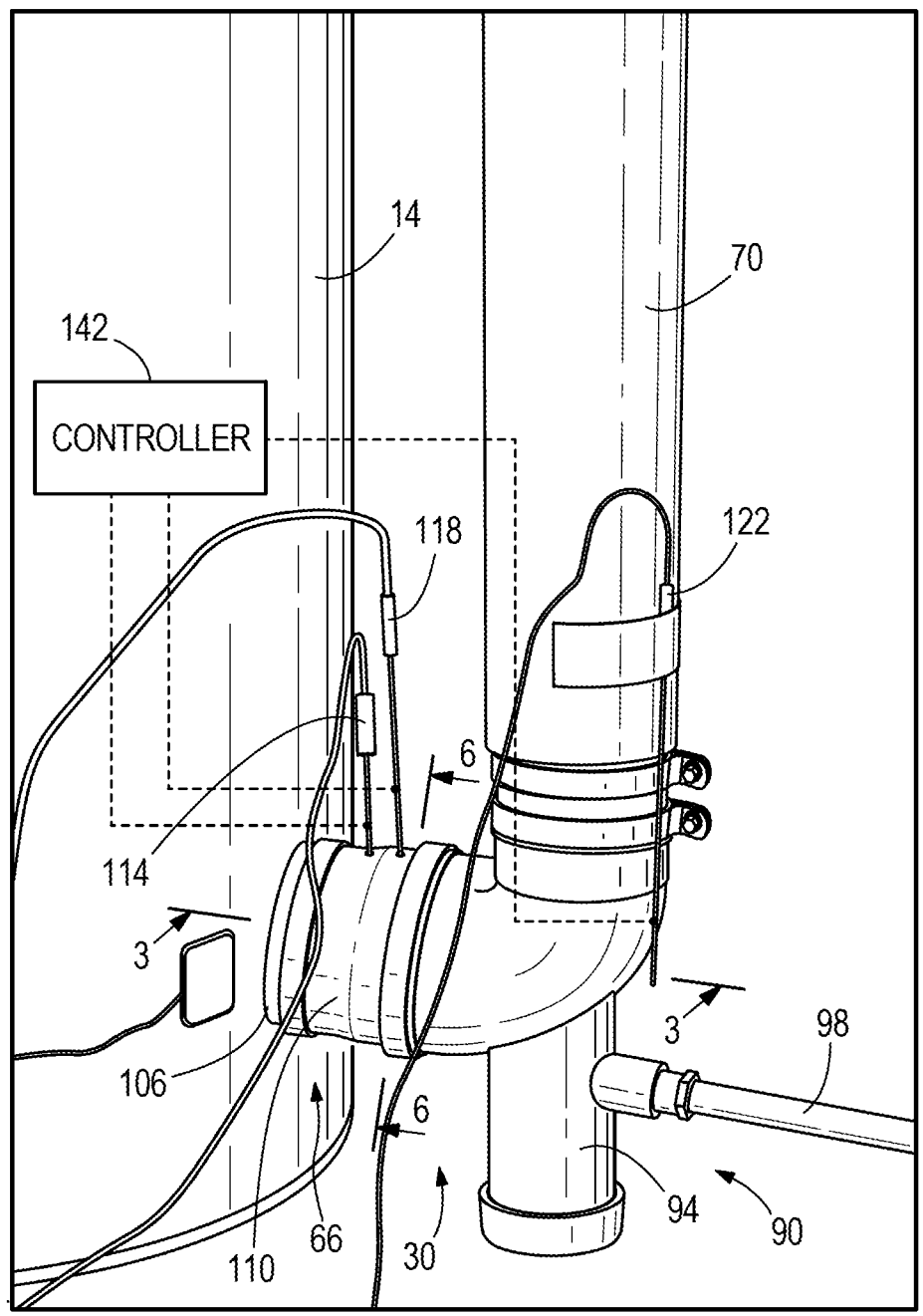
FIG. 2 is a perspective view of an intermediate pipe connecting the heat exchanger and the vent pipe of FIG. 1.

With reference to FIGS. 1 and 2, the flue 26 is in fluid connection with the exhaust assembly 30. The exhaust assembly 30 includes an intermediate section 66 and a vent pipe 70. The illustrated intermediate section 66 is in connection with the coil section 54c through a wall of the tank 14. The intermediate section 66 is positioned between the coil section 54c and the vent pipe 70. In the illustrated embodiment, the coil section 54c and the intermediate section 66 are connected by a third elbow 74, which is part of the flue 26. The vent pipe 70 is in fluid connection with the outside atmosphere (e.g., outside of a room).

The flue gas circuit 34 includes the combustion chamber 22, the flue 26, and the exhaust assembly 30. The flue gases are configured to flow along the flue gas circuit 34 from the combustion chamber 22, through the flue 26 and the exhaust assembly 30, to the outside atmosphere (outside of the room).

In particular, the flue gases are generated by the gas burner 18 and flow from the combustion chamber 22 to the narrowing section 54a. The narrowing section 54a communicates between a lower end of the combustion chamber 22 and the first elbow 58. The narrowing section 54a is shaped as a nozzle and causes the velocity of the flue gases to increase as they are delivered to the first elbow 58. A bottom end 78 of the vertical section 54b receives the flue gases from the narrowing section 54a (via the first elbow 58). The flue gases rise in the vertical section 54b and are delivered to a top end 82 of the vertical section 54b. Subsequently, the flue gases are received in the coil section 54c (via the second elbow 62). The coil section 54c guides the flue gases along a downward spiral path to the intermediate section 66. The bends of the first and second elbows 58, 62 change the direction of flow of the flue gases. For example, the first elbow 58 turns the direction of flow of the flue gases from downward (as received from the narrowing section 54a) to upward (as delivered to the vertical section 54b).

With reference to FIGS. 1 and 2, the intermediate section 66 of the exhaust assembly 30 receives the flue gases from the coil section 54c and guides the flue gases horizontally to the vent pipe 70 where the flue gases are vented to the outside atmosphere. The bend of the third elbow 74 changes the direction of flow of the flue gases from coiling (as guided along the coil section 54c) to horizontal (as delivered to the intermediate section 66).

As the flue gases travel along the flue gas circuit 34 from the combustion chamber 22 to an end 86 of the coil section 54c, heat is transferred from the hot flue gases to the water within the interior space 50 defined by the tank 14. Specifically, the flue gases are in contact with the interior surfaces of the combustion chamber 22 and the flue 26, and the water is in contact with the outer surfaces of the combustion chamber 22 and the flue 26 such that the heat is transferred from the flue gases to the water by conduction. As the flue gases lose heat to the water, a temperature of the flue gases may fall below a predetermined temperature limit (e.g., 130 degrees Fahrenheit). Condensate forms from the flue gases within the coil section 54c once the temperature of the flue gases falls below the predetermined temperature limit. Subsequently, the condensate is guided along a downward spiral path from the coil section 54c to the intermediate section 66 (i.e., by gravity).

In other embodiments, the heat exchanger 12 (e.g., combustion chamber 22 and flue 26) may include separate flue tubes, instead of the coil section 54c, that extend vertically through the tank 14. These flue tubes received the flue gases from the gas burner 18. Each of the flue tubes may further include baffles to enhance heat transfer from the flue gases to the water. In still other embodiments, the tank 14 may be configured to receive the hot flue gases from the gas burner 18 (instead of the water), and the water flows through the flue 26 (i.e., coil section 54c). In this embodiment, the gas burner 18 and the exhaust assembly 30 are each in fluid connection with the tank 14, and the water inlet 42 and the water outlet 46 are each in fluid connection with the heat exchanger coil (e.g., the flue 26 having the coil section 54c). As such, in this alternative configuration, the water heater 10 is a tankless water heater. Furthermore, the water heater 10 may further include flue gas flow members (e.g., baffles, plates, etc.) positioned within the tank 14 to facilitate the flow of the flue gases proximate the heat exchanger coil receiving the water. This may increase the heat transfer between the water and the flue gases. The intermediate section 66, in this embodiment, is in fluid connection with the tank 14. The flue gas flow members may direct the condensate toward the intermediate section 66.

Figure 6:
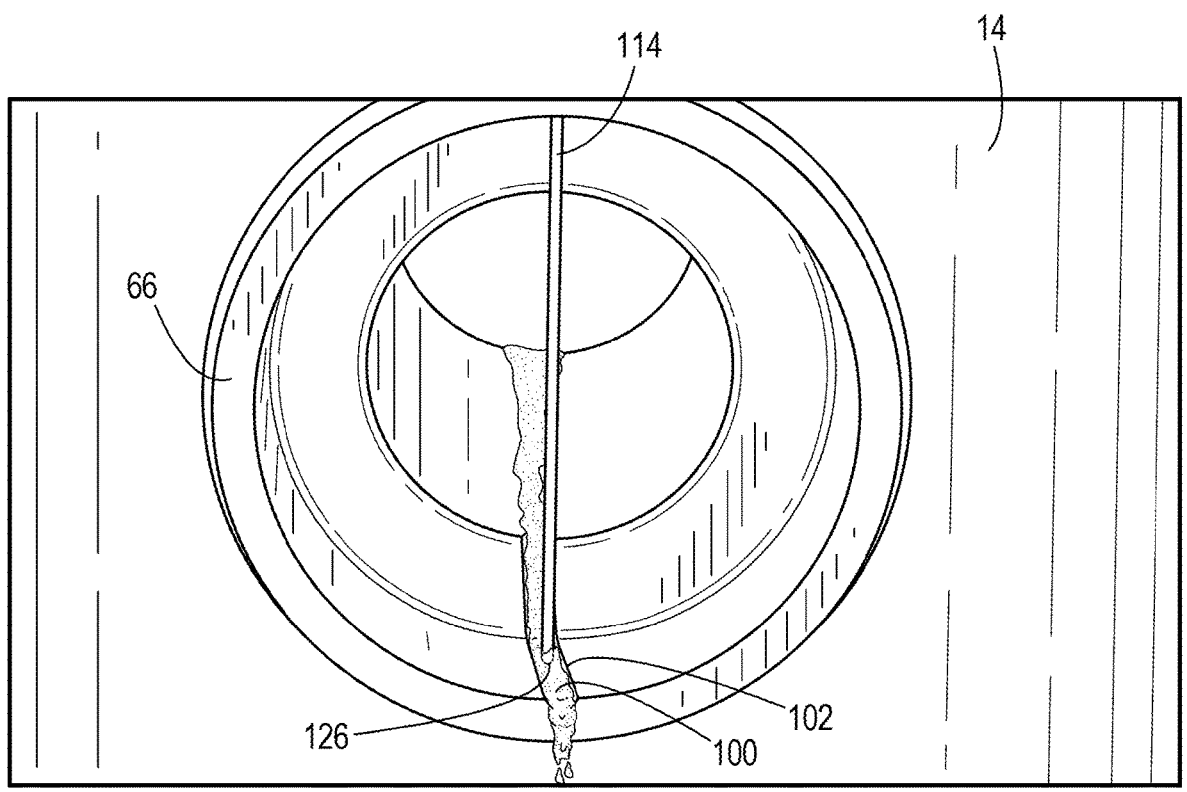
FIG. 6 is a partial, cross-sectional view of the intermediate pipe of FIG. 2 taken along lines 6-6 in FIG. 2.

With reference to FIGS. 1-3, the exhaust assembly 30 further includes a condensate collector or drain assembly 90 in fluid connection with the intermediate section 66. The drain assembly 90 includes a drain pipe 94 and a drain line 98. The condensate flows (e.g., by gravity) to the drain pipe 94 from the intermediate section 66, and the condensate fills the drain pipe 94 and is drawn out of the water heater 10 by the drain line 98. As shown in FIG. 6, the condensate may form a condensate stream 100 in the intermediate section 66. The intermediate section 66 may further define a groove 102 to facilitate forming of the condensate stream 100 in the intermediate section 66. In addition, the groove 102 may facilitate directing of the condensate stream 100 to the drain pipe 94.

With reference to FIGS. 1-3, the intermediate section 66 includes a first portion 106 and a second portion 110. The illustrated first portion 106 is formed by a first material, and the second portion 110 is formed by a second material different than the first material. For example, in the illustrated embodiment, the first material of the first portion 106 is metal (e.g., Aluminum), and the second material of the second portion 110 is a non-heat conducting material such as rubber. Furthermore, the vent pipe 70 is formed of a third material such as plastic piping (Polyvinyl Chloride (PVC) pipe). The first, second, and third materials are configured to withstand the temperatures of the condensate stream 100 and the flue gases as both exit the water heater 10 (through the drain line 98 and the vent pipe 70, respectively).

Figure 8A:
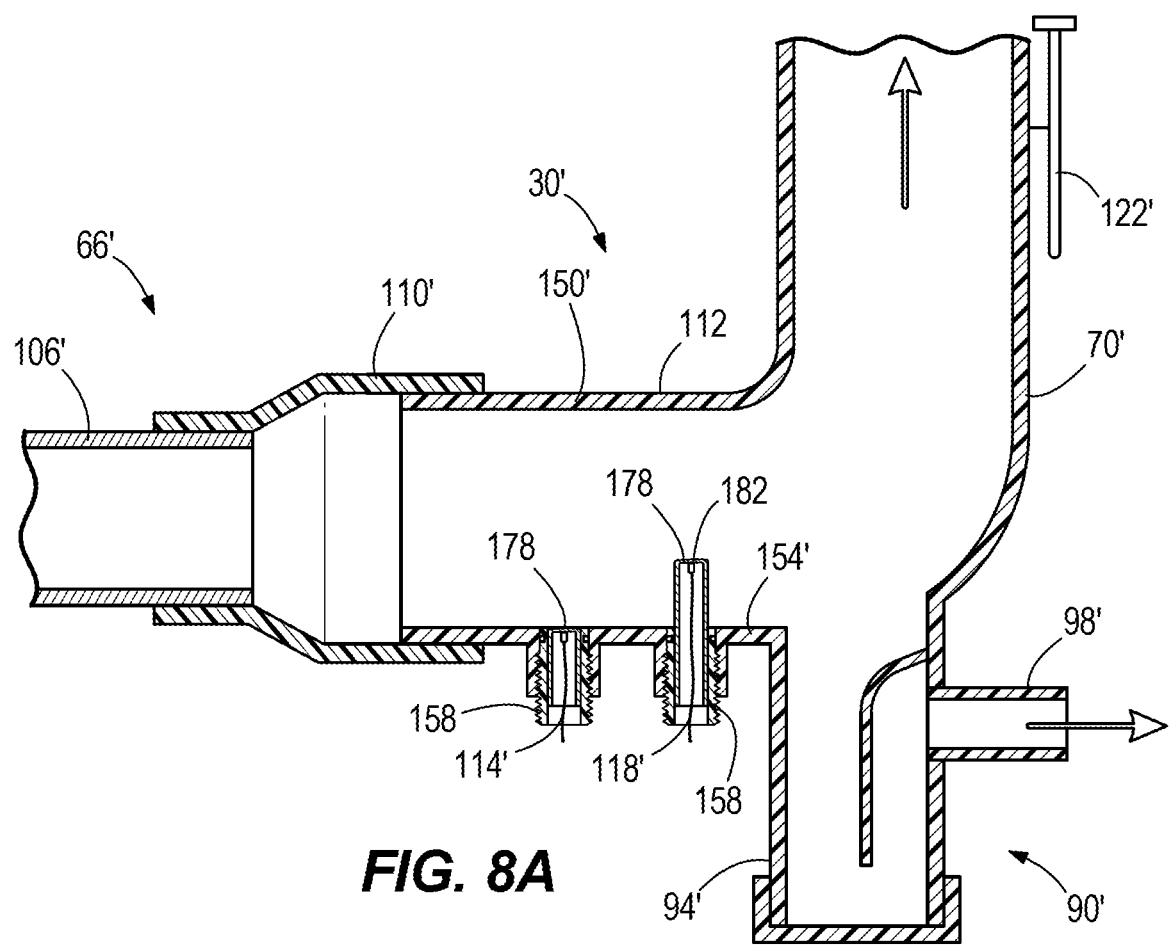
FIG. 8A is a cross-sectional view of another intermediate pipe according to a construction of the present invention, illustrating temperature sensors positioned on a bottom side of the intermediate pipe.
Figure 8B:
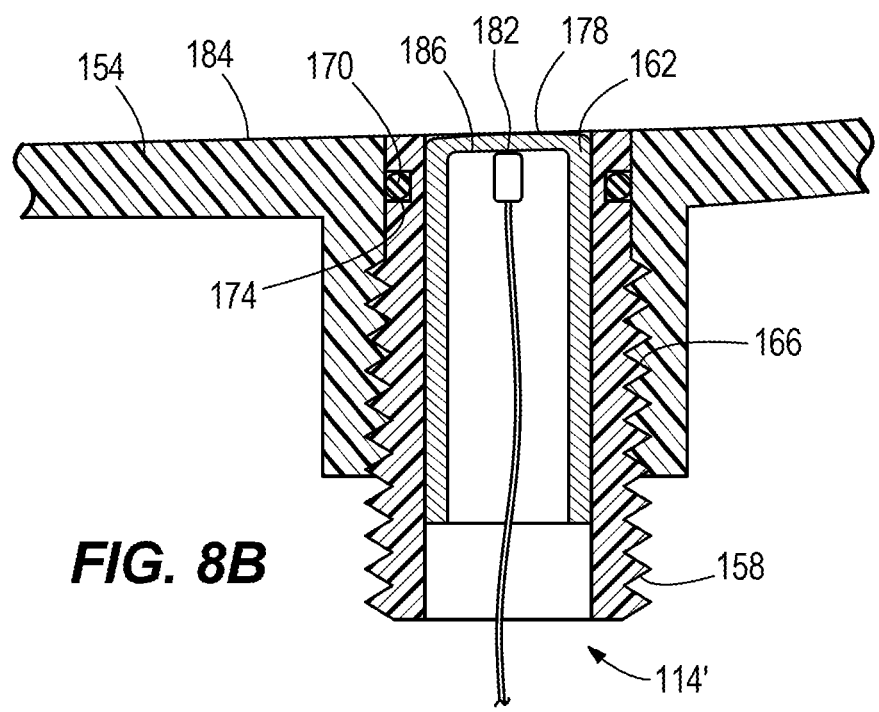
FIG. 8B is an enlarged view of one of the temperature sensors of FIG. 8A.

With reference to FIGS. 2 and 3, the water heater 10 includes a plurality of temperature sensors 114, 118, 122 (e.g., thermocouples). A first temperature sensor 114 is positioned through the second portion 110 of the intermediate section 66. The first temperature sensor 114 is configured to detect a temperature of the condensate stream 100. In addition, a second temperature sensor 118 is positioned through the second portion 110 of the intermediate section 66. The second temperature sensor 118 is configured to detect a temperature of the flue gases being vented through the intermediate section 66. In other words, the first temperature sensor 114 is positioned to sense a temperature of the condensate flowing through the exhaust assembly 30, and the second temperature sensor 118 is positioned to sense a temperature of the flue gases flowing through the exhaust assembly 30. In the illustrated embodiment, each temperature sensor 114, 118 extends from a top side 150 of the intermediate section 66. In other embodiments, as shown in FIGS. 8A-8B, each temperature sensor 114', 118' is positioned on a bottom side 154 of the intermediate section 66.

The water heater 10 further includes a third temperature sensor 122 configured to detect a temperature of the outside atmosphere (e.g., the room). In the illustrated embodiment, as shown in FIG. 2, the third temperature sensor 122 is positioned on and supported by an outer surface of the vent pipe 70. In other embodiments, the third temperature sensor 122 may be positioned at other locations on the water heater 10 (e.g., the tank 14, etc.). In still other embodiments, the water heater 10 may further include other temperature sensors positioned with the tank 14 to measure temperatures of the water at specific areas within the tank 14 (i.e., water at the bottom, water at the top, etc.).

With reference to FIGS. 3-4A and 6, a tip 126 of each of the temperature sensors 114, 118, 122 is in contact with the fluid (e.g., condensate, flue gases, air) for detecting the temperature of the respective fluid. For example, as shown in FIG. 3, the tip 126 of the first temperature sensor 114 is positioned proximate a bottom 128 of the intermediate section 66 such that the tip 126 of the first temperature sensor 114 is positioned in the condensate stream 100 flowing through the intermediate section 66. Specifically, as shown in FIG. 6, the tip 126 of the first temperature sensor 114 may be positioned within the groove 102. With again reference to FIG. 3, the first temperature sensor 114 extends farther (in a radial sense) into the intermediate section 66 than the second temperature sensor 118. As such, the tip 126 of the second temperature sensor 118 is only in contact with the flue gases flowing through the intermediate section 66.

Figure 5:
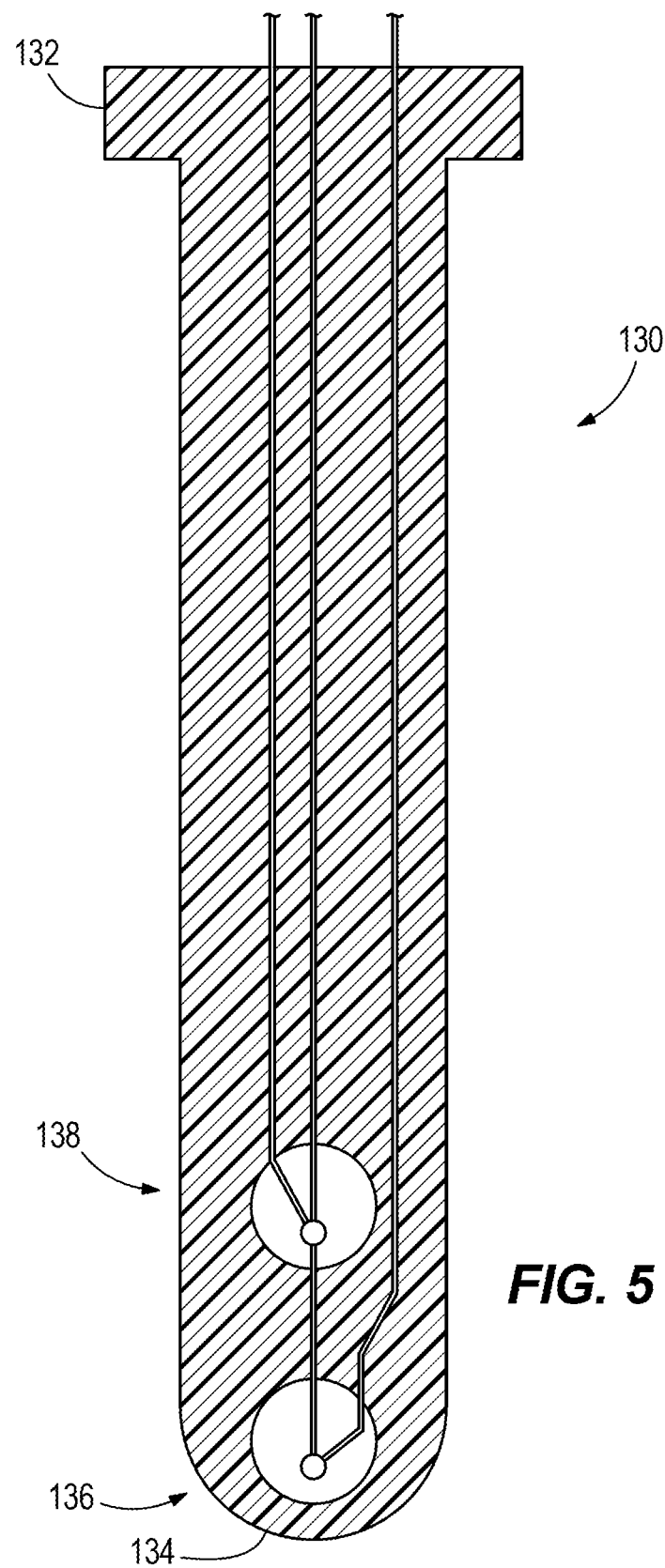
FIG. 5 is a schematic view of another temperature sensor embodying the invention.

In another construction, as shown in FIG. 5, the first and second temperature sensors form one temperature sensor 130 for detecting both the temperature of the condensate stream 100 and the temperature of the flue gases flowing through the intermediate section 66. The temperature sensor 130 includes a base end 132 and a distal tip 134. A first portion 136 of the temperature sensor 130 is configured to detect the temperature of the condensate stream 100. A second portion 138 of the temperature sensor 130 is configured to detect the temperature of the flue gases. The first portion 136 is closer to the distal tip 134 than the second portion 138 such that the first portion 136 may be defined as a distal portion, and the second portion 138 may be defined as a proximal portion. As such, the first portion 136 may only be in contact with the condensate stream 100 and the second portion 138 may only be in contact with the flue gases.

FIGS. 8A-8B illustrate another embodiment of an exhaust assembly 30' with like components and features as the embodiment of the water heater 10 shown in FIGS. 1-7 being labeled with like reference numerals plus a prime symbol "'". The exhaust assembly 30' is similar to the exhaust assembly 30 of the water heater 10 and, accordingly, the discussion of the water heater 10 and the exhaust assembly 30 above similarly applies to the exhaust assembly 30' and is not re-stated. Rather, only differences between the exhaust assembly 30 and the exhaust assembly 30' are specifically noted herein, such as differences in the positioning of the temperature sensors.

The exhaust assembly 30' includes first and second temperature sensors 114' and 118'. Each temperature sensor 114', 118' includes an adapter 158 and a housing 162 surrounding the respective temperature sensor 114', 118'. In the illustrated embodiment, with particular reference to FIG. 8B, a third portion 112 of an intermediate section 66' of the exhaust assembly 30' defines a threaded bore 166 for each temperature sensor 114', 118, and the adapter 158 of each temperature sensor 114', 118' has corresponding threads and is received in the respective bore 166. A seal member, such as an O-ring 170, is positioned between the respective adapter 158 of each temperature sensor 114' 118' and a wall 174 forming the threaded bore 166 of the third portion 112. The O-ring 170 is configured to inhibit leakage of a condensate stream (e.g., condensate stream 100) and the flue gases to the room through the intermediate section 66'. The housing 162 of the respective temperature sensor 114', 118' is securably coupled within the respective adapter 158, such as by press-fitting.

A first side 178 of the housing 162 for each temperature sensor 114', 118' is configured to contact the respective fluid (e.g., condensate stream 100, flue gases). For example, the first temperature sensor 114' is positioned on a bottom side 154' of the intermediate section 66' such that an end wall 182 (FIG. 8B) of the housing 162 is adjacent and even with a bottom 184 of the third portion 112. The condensate stream is configured to flow over the end wall 182 of the housing 162 of the first temperature sensor 114' as the condensate stream 100 flows toward a drain pipe 94' of the exhaust assembly 30'. In another example, the second temperature sensor 118' extends through the bottom side 154' of the third portion 112 such that the end wall 182 of the housing 162 is positioned intermediate a top side 150' and the bottom side 154' within the third portion 112, and the first side 178 of the housing 162 contacts the flue gases flowing through the intermediate section 66.

The housing 162 is formed of a first, heat conducting material, such as metal, such that the heat is transferred from the fluid in contact with the first side 178 of the housing 162 to a second side 186 of the housing 162 by conduction. The respective temperature sensor 114', 118' (e.g., thermocouple) is in contact with the second side 186 of the housing 162 for detecting the temperature of the fluid based on a temperature reading of the housing 162. The adapter 158 is formed of a second, non-heat conducting material that is different than the first material, such as plastic. As such, the adapter 158 is configured to form a barrier or otherwise inhibit contact between the third portion 112 and the housing 162 of the respective temperature sensor 114', 118'. Accordingly, although a position of the temperature sensors 114, 118 may be changed within the exhaust assembly as described and illustrated above, the temperature sensors may still be configured to detect a temperature of the condensate stream flowing through the exhaust assembly, and a temperature of the flue gases, respectively, when the water heater 10 is operating during the heating mode and the standby mode.

The following paragraphs describe the control system 38 for determining whether an error (e.g., water leakage, drain blockage, etc.) has occurred within the water heater 10.

The control system 38 of the water heater 10 includes a controller 142 (FIG. 2) and the first, second, and third temperature sensors 114, 118, 122. The first, second, and third temperature sensors 114, 118, 122 are electrically connected to the controller 142. The controller 142 is configured to determine temperature readings of the first, second, and third temperature sensors 114, 118, 122. Specifically, the controller 142 may be configured to monitor the temperature readings over time. The controller 142 is further configured to compare the temperature readings of the first, second, and third temperature sensors 114, 118, 122 to determine whether an error has occurred in the water heater 10 (e.g., leakage, drain blockage), as further discussed below. In other embodiments, the slopes of the temperature readings may be monitored and compared to determine whether an error has occurred. Furthermore, in the illustrated embodiment, the controller 142 itself is a part of the water heater's control system 38. However, in other embodiments, the controller 142 may be separate, but electrically connected to, the control system 38. Accordingly, the controller 142 is configured to connect to and communicate with a controller of the burner 18. As such, the controller 142 is configured to determine the mode (e.g., heating, standby) that water heater 10 is operating in and/or control operation of the water heater 10.

With reference to FIG. 7, the control system 38, and specifically the controller 142 (FIG. 2) is programmed with two basic logic loops relevant to this disclosure: a heating mode loop 210 and a standby mode loop 215. At decision point 220, the controller 142 decides which loop to enter based on whether there is a call for heat. If there is a call for heat at decision point 220, the controller 142 enters the heating mode loop 210 and if there is no call for heat, the controller 142 enters the standby mode loop 215.

In the heating mode loop 210, the controller queries the first and second temperature sensors 114, 118 at decision point 225 to obtain and compare the respective temperature of condensate and temperature of flue gases at the intermediate section 66. At decision point 225, the controller 142 calculates whether the temperature of the condensate is equal to the temperature of the flue gases. If the temperature of condensate is not equal to the temperature of flue gases at intermediate section 66, the controller 142 determines at box 230 that there is no drain blockage, and returns to decision point 220. If the temperature of condensate is equal to the temperature of flue gases at intermediate section 66, the controller 142 concludes at 235 that the condensate is stagnating in the intermediate section 66. When the condensate stagnates in the intermediate section, the condensate is heated by flue gases and assumes the same temperature as the flue gases. The controller 142 concludes that the cause of the stagnation is a blockage somewhere in the drain assembly 90 (e.g., in the drain line 98). Furthermore, should the water heater 10 continue to operate for a period of time after the controller 142 concludes that there is a drain blockage, the condensate will build up in the drain pipe 94 and eventually the intermediate section 66. The tip 126 (or the end wall 182 of the housing 162) of the second temperature sensor 118, 118' eventually becomes submerged in the condensate as the water heater 10 continues operating in the heating mode loop 210. The first and the second temperatures sensors 114, 118 are both submerged in the condensate such that the temperature of condensate (i.e., temperature reading of the first temperature sensor 114) is equal to the temperature of flues gases (i.e., temperature reading of the second temperature sensor 118).

In the standby mode loop 215, the controller 142 queries the first and third temperature sensors 114, 122 at decision point 240 to obtain and compare the respective temperature of condensate and temperature of room air. At decision point 240, the controller 142 calculates whether the temperature of condensate is equal to the temperature of room air. In the illustrated embodiment of the tank water heater 10 and the alternative embodiment of the tankless water heater, if the temperature of condensate is equal to or close to the temperature of room air, the controller 142 determines at box 245 that there is no leakage of water (from the tank 14, or from the heat exchanger coil in the alternative embodiment). In the illustrated embodiment of the tank water heater 10, if the temperature of condensate is not equal to the temperature of room air, the controller 142 determines that hot water is present in the intermediate section 66. In particular, during the standby period, the presence of hot water (i.e., above room temperature) means that the water is coming from inside the tank 14. The controller 142 thus concludes at 250 that there is leakage (i.e., leakage of water from the tank 14 through the wall of the flue 26 such that the hot water is flowing to the drain assembly 90).

In the alternative embodiment of the tankless water heater, if the temperature of condensate is not equal to the temperature of room air, the controller 142 determines that cold water is present in the intermediate section 66. Specifically, during the standby period, the presence of cold water (i.e., below room temperature) means that the water is coming from the heat exchanger coil. The controller 142 thus concludes at 250 that there is a leakage (i.e., leakage of water from the heat exchanger coil such that the cold water is flowing to the drain assembly 90).

During the heating mode, during normal operation, the temperature detected by the first temperature sensor 114 (i.e., condensate stream 100) should remain relatively lower than the flue gas temperature (e.g., 10° F. lower) detected by the second temperature sensor 118 (i.e., flue gases). The temperature difference may be, for example, between about 5 and 20° F. If the water heater 10 is not operating properly during the heating mode, then the temperature reading of the first temperature sensor 114 may converge to about the same temperature reading of the second temperature sensor 118 in both the embodiments of the tank and tankless water heater. The controller 142 may be further configured to deactivate operation of the water heater 10 once the drain blockage is determined, and indicate to a user that an error has occurred in the water heater 10.

Once the water heater 10 has entered the standby mode, the temperature detected by the first temperature sensor 114 (i.e., condensate stream 100) should converge relatively quickly (e.g., three minutes, depending on the length of the heat exchanger 12 and the point of leakage) to about the same temperature as the temperature detected by the third temperature sensor 122 (i.e., outside atmosphere). If the water heater 10 is not operating properly, then the temperature reading of the first temperature sensor 114 may remain higher or lower (depending if it is a tank or tankless water heater, respectively) than the temperature reading of the third temperature sensor 122 after the water heater 10 enters the standby mode. This temperature difference indicates to the controller 142 that there is a leakage of water from the tank 14 through the wall of the flue 26, or the heat exchanger coil. The temperature difference may be, for example, about two ° F. or more. The controller 142 may be further configured to deactivate operation of the water heater 10 once the leakage is determined, and indicate to a user that an error has occurred in the water heater 10. Furthermore, in some embodiments, if the water begins leaking at a small rate, the temperature difference may be monitored over time by the controller 142 such that the controller 142 may be able to determine a location of the leakage and/or leakage rates.

More specifically, in some embodiments, the control system 38 (i.e., controller 142) may be programmed to monitor the change in tolerance of the temperature readings of each of the temperature sensors 114, 118, 122. When the water heater (or the controller) is first installed, the temperature reading of the first temperature sensor 114 may have a temperature difference (° F.) from the temperature reading of the third temperature sensor 122 during the standby mode. For example, the temperature difference may be one ° F. Accordingly, the controller 142 determines that the tolerance is corrected by one ° F. The controller 142 may be programmed to record that the tolerance is a baseline. The controller 142 may be further programmed to monitor the change (i.e., increase or decrease) in tolerance between the temperature readings of the first, second, and third temperature sensors 114, 118, 122. For example, should the controller determine that the tolerance has changed from one ° F. to three ° F. between the temperature reading of the first temperature sensor 114 and the third temperature sensor 122 during the standby mode, the controller may determine there is a leakage and indicate to a user to check the water heater. The controller may monitor the change in tolerance such that should the change in tolerance reach a predetermined limit (i.e., plus or minus five ° F. or more), the controller will determine that there is a leakage, and inhibit operation of the water heater until the leakage has been fixed and the control system 38 has been re-set. For example, when the tolerance changes from one ° F. to three ° F., the controller 142 determines a leakage and indicates to the user to check the water heater 10. And further, when the tolerance changes to five ° F., the controller 142 determines a leakage and inhibits operation of the water heater 10. As such, this may facilitate detecting a leakage during water heaters operating with short (i.e., between about 1 minute to five minute) standby periods.

Further, in other embodiments, the temperature readings of the first temperature sensor 114 (i.e., condensate stream 100) may be compared to temperature readings from the temperature sensors positioned within the tank 14. A location of where the leakage is occurring may be determined by the controller when the temperature readings of these temperature sensors are compared while the water heater 10 is in the standby mode. Still further, in other embodiments, a Positive Temperature Coefficient (PTC) heater may be integrated with the first temperature sensor 114. The PTC heater may be used to measure a leakage rate. In particular, power to the PTC heater is fixed. If, during the standby mode, the temperature readings of the first temperature sensor 114 are different, than different leakage rates may be indicated to the controller.

The controller 142 may be configured to query the first, second, and third temperature sensors 114, 118, 122 during specific time periods of the day when determining a drain blockage or a leakage. For example, when determining a drain blockage, the controller 142 may be configured to query the first and second temperature sensors 114, 118 during morning hours when it is most likely the user will require use of hot water. In another example, when determining a leakage, the controller 142 may be configured to query the first and third temperature sensors 114, 122 during evening hours (i.e., sleeping) when it is most likely the user will not require use of hot water. Furthermore, the controller 142 may be configured to determine whether there is a drain blockage or a leakage for a predetermined frequency. For example, the predetermined frequency may be once a week, once a month, etc.

Figure 9:
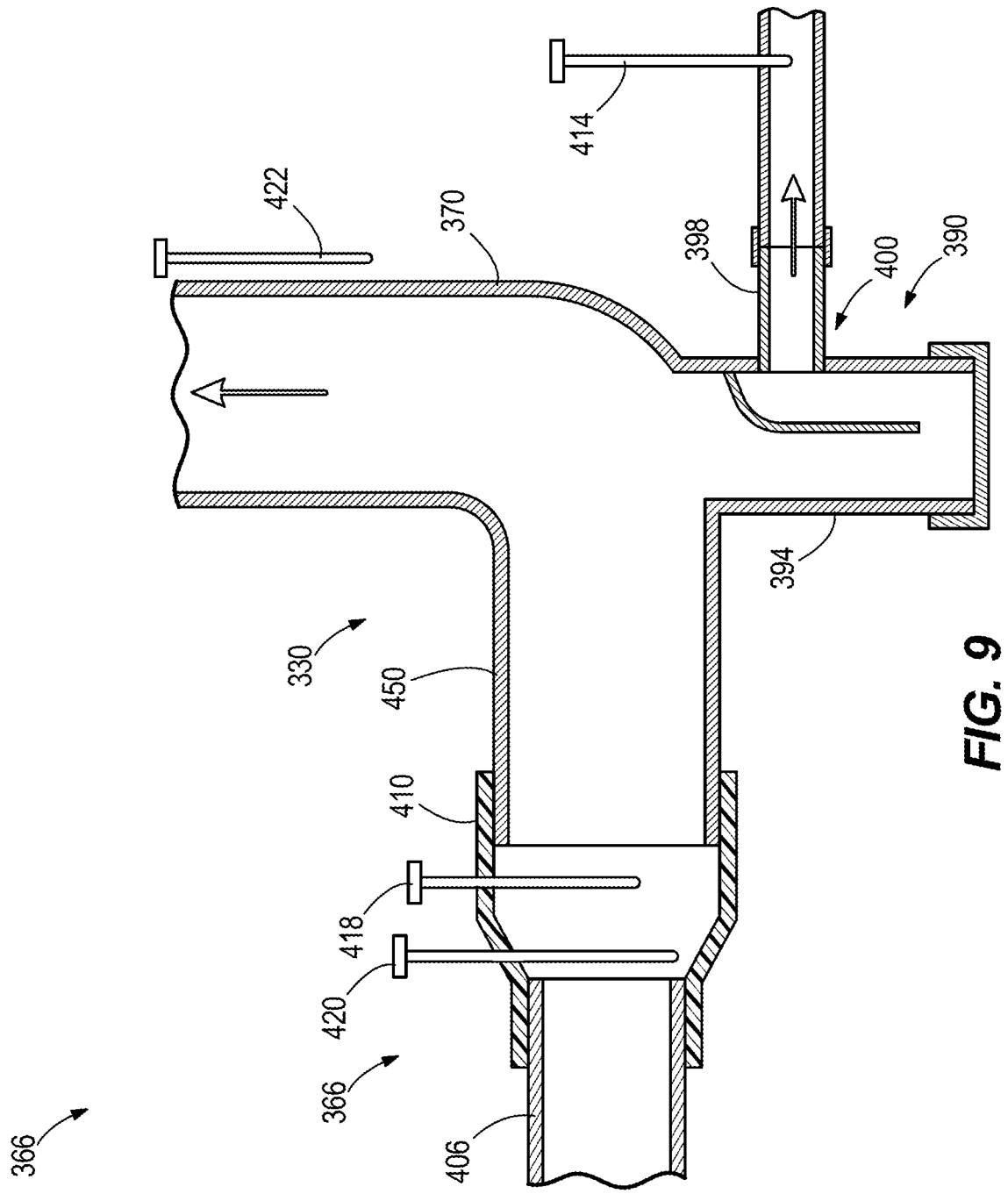
FIG. 9 is a cross-sectional view of yet another intermediate pipe according to a construction of the present invention, illustrating an alternative position of temperature sensors in the intermediate pipe.

FIG. 9 illustrates yet another embodiment of an exhaust assembly 330 for the water heater 10, with like components and features as the embodiment of the water heater 10 shown in FIGS. 1-7 being labeled with like reference numerals plus "300." The exhaust assembly 330 is similar to the exhaust assembly 30 of the water heater 10 and, accordingly, the discussion of the water heater 10 and the exhaust assembly 30 above similarly applies to the exhaust assembly 330 and is not re-stated. Rather, only differences between the exhaust assembly 30 and the exhaust assembly 330 are specifically noted herein, such as differences in the positioning of the temperature sensors, and how the control system determines a leakage.

The exhaust assembly 330 includes an intermediate section 366 and a vent pipe 370 fluidly connected to the intermediate section 366. The intermediate section 366 and the vent pipe 370 receive the flue gases from the heat exchanger (e.g., heat exchanger 12 of the first embodiment) and exhaust the flue gases to the outside atmosphere. The exhaust assembly 330 further includes a condensate collector or drain assembly 390 in fluid connection with the intermediate section 366. The drain assembly 390 includes a drain pipe 394 and a drain line 398. The condensate flows (e.g., by gravity from the heat exchanger) to the drain pipe 394 from the intermediate section 366, and the condensate fills the drain pipe 394 and is drawn out of the water heater by the drain line 398.

The intermediate section 366 includes a first portion 406 and a second portion 410. The water heater (e.g., water heater 10) further includes a plurality of temperature sensors 414, 418, 420, 422 (e.g., thermocouples). Unlike the first embodiment of FIGS. 1-7, a first temperature sensor 414 is positioned through a top of the drain line 398. The first temperature sensor 414 is configured to detect a temperature of the condensate exiting the exhaust assembly 330 after collecting in the drain pipe 394. In other words, the first temperature sensor 414 is positioned to detect the temperature of the condensate after it has been guided through the intermediate section 366, and accumulated in the drain pipe 394 to reach the drain line 398. Additionally, a second temperature sensor 418 and a third temperature sensor 420 is positioned through the second portion 410 of the intermediate section 366 (similar to the second and first temperature sensors 118, 114, respectively, of FIGS. 1-7). The second temperature sensor 418 is configured to detect a temperature of the flue gases being vented through the intermediate section 366. The third temperature sensor 420 is positioned to detect a temperature of the condensate (e.g., condensate stream 110 of the first embodiment) flowing through the intermediate section 366. In particular, the temperature sensors 414, 420 are both configured to detect a temperature of the condensate within the exhaust assembly 330, but at different locations along a path the condensate follows to exit the water heater.

Specifically, a downstream direction is defined as the direction the condensate flows from the heat exchanger toward the drain line 398. The first temperature sensor 414 is positioned at a location along the path that is further downstream than a position of the third temperature sensor 420 such that the first temperature sensor 414 detects the temperature of the condensate that has travelled along the path for a larger distance then the temperature of the condensate detected by the third temperature sensor 420. Furthermore, the drain pipe 394 and a beginning portion of the drain line 394 upstream of the location of the first temperature sensor 414 may be collectively referred to as a condensate management portion 400 of the exhaust assembly 390. The illustrated water heater further includes a fourth temperature sensor 422 positioned to sense a temperature of the outside atmosphere (e.g., the room).

In other embodiments, the water heater may include one or more temperature sensors 414, 418, 420, 422. For example, in other embodiments, the water heater may include the first temperature sensor 414, the second temperature sensor 418, and the fourth temperature sensor 422. In another example, the water heater may include the first temperature sensor 414 and the second temperature sensor 418. Still further, in another example, the water heater may include only the first temperature sensor 414.

Similar to the first embodiment of FIGS. 1-7, the water heater includes a control system 338 (FIG. 11) for determining whether an error has occurred in the water heater. The control system 338 includes a controller (e.g., controller 142; FIG. 2) and the first, second, third, and fourth temperature sensors 414, 418, 420, 422. The first, second, third, and fourth temperature sensors 414, 418, 420, 422 are electrically connected to the controller such that the controller is configured to determine temperature readings of the first, second, third, and fourth temperature sensors 414, 418, 420, 422.

Figure 10:
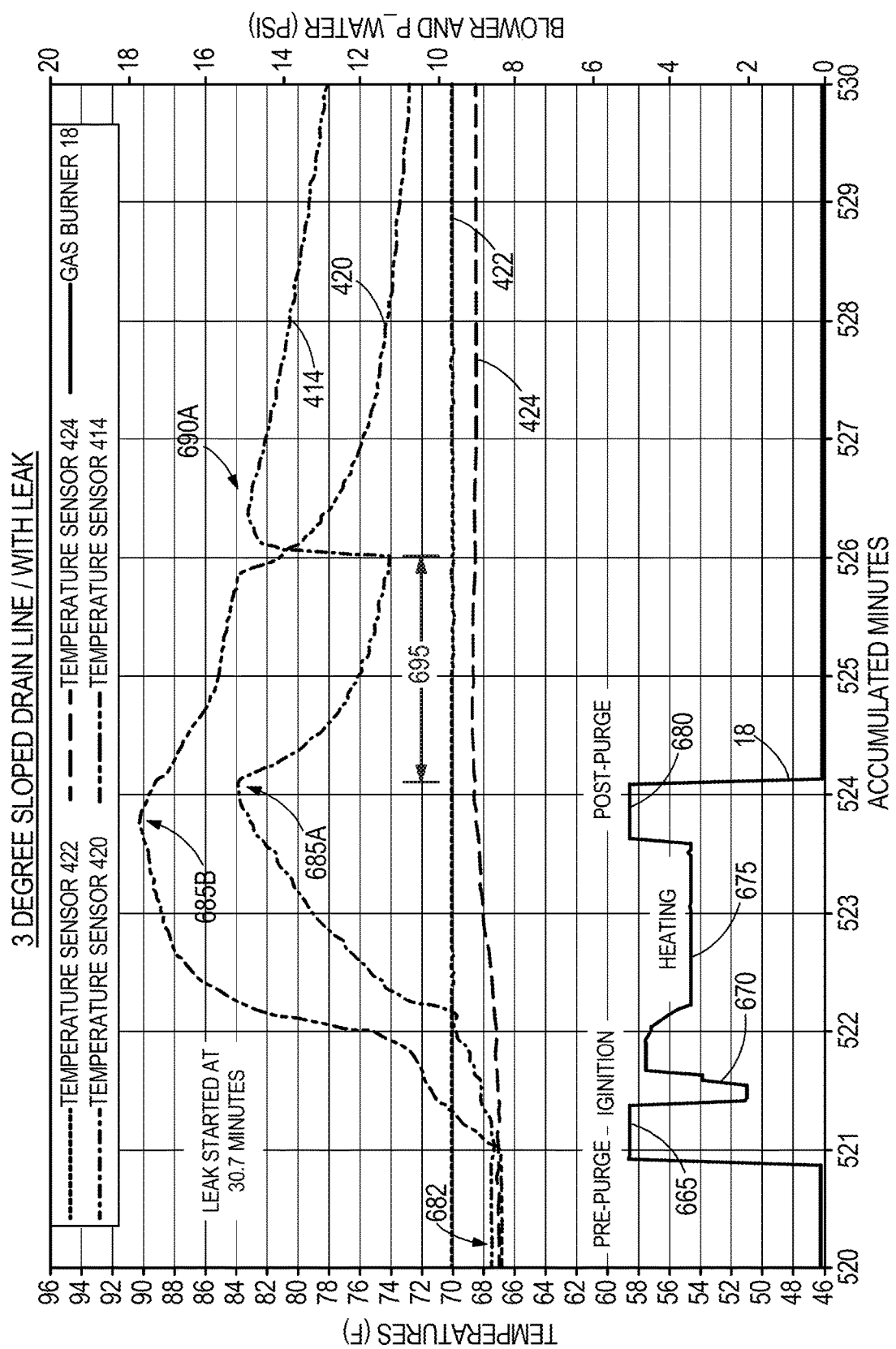
FIG. 10 is a graph illustrating a change in temperature readings of the temperature sensors of FIG. 9 over time when a leakage in the water heater has occurred

FIG. 10 is a graph illustrating a change in the temperature readings of the respective temperature sensors 414, 420, 422 over time when a leakage in the water heater has occurred. In particular, FIG. 10 illustrates the temperature readings of the respective temperature sensors 414, 420, 422 over time as the water heater operates between the heating mode (i.e., when the gas burner 18 is operating) and the standby mode (i.e., when the gas burner 18 is not operating). For example, in the illustrated embodiment, the water heater is in the standby mode between the time of 520 to about 521 minutes. In addition, the water heater enters the standby mode from the heating mode at about 524 minutes. Further, in the illustrated embodiment, the water heater is in the heating mode between about 521 minutes and about 524 minutes.

With continued reference to FIG. 10, the gas burner 18 is operable in a plurality of states during the heating mode. In the illustrated embodiment, the gas burner is operable between a first state or pre-purge 665, a second state or ignition 670, a third state or heating with modulation 675, and a fourth state or a post purge 680. As the gas burner 18 operates in the different states, the temperature readings of the temperature sensors 414, 420, 422 change over time (e.g., increase in temperature or decrease in temperature) such that the temperature readings over time have a positive rate of temperature change, a negative rate of temperature change, or a zero rate of temperature change. In addition, the temperature readings change during the standby mode, which may be used by the controller to determine whether a leakage has occurred in the water heater, as further discussed below.

In particular, during normal operation, when the water heater is in the standby mode, there are no flue gases condensing such that the temperature reading of each of the temperature sensors 414, 420 is at about the same baseline temperature or minimum temperature limit 682 (e.g., about 67.7° F.; at 520 minutes to about 521 minutes in the illustrated embodiment). This minimum temperature limit 682 may be proximate a temperature of the outside atmosphere detected by the third temperature sensor 422. For example, in the illustrated embodiment, the temperature detected by the third temperature sensor 422 is about 70.0° F.

As the water heater begins to operate in the heating mode, the flue gases begin to condense, and the temperature reading over time of each of the first and third temperature sensors 414, 420 has a positive rate of change. More specifically, the temperature reading of each of the first and third temperature sensors 414, 420 increases from the minimum temperature limit 682 to a respective maximum temperature limit (i.e., first peak 685A, 685B, respectively). This increase or positive rate of change is representative of a temperature of the condensate now being produced during the heating mode. The maximum temperature limit 685A of the first temperature sensor 414 is less than the maximum temperature limit 685B of the third temperature sensor 420 (e.g., at about 524 minutes) because of the positioning of the first temperature sensor 414 at the location that is further in the downstream direction in which the temperature of the condensate detected by the first temperature 414 has had more time to cool off (i.e., decrease in temperature). For example, in the illustrated embodiment, the maximum temperature limit 685B of the third temperature sensor 420 is about 90.5° F., and the maximum temperature limit 685A of the first temperature sensor 414 is about 84° F. The temperature reading of each of the first and third temperature sensors 414, 420 reaches the maximum temperature limit 685A, 685B, respectively, when the gas burner 18 is in the post purge state 680.

Further, during normal operation, the temperature reading of each of the first and third temperature sensors 414, 420 begins to return to the minimum temperature limit 682 (e.g., about 67.7° F.) once the water heater enters the standby mode. For example, in the illustrated embodiment, the temperature readings of both temperature sensors 414, 420 begin to decrease (i.e., have a negative rate of change) at about 524 minutes. Although FIG. 10 illustrates the temperature reading over time of each of the first and third temperature sensors 414, 420 increasing at different rates of change, the temperature reading of each of the first and third temperature sensors 414, 420 will eventually return to about the same minimum temperature limit 682 (e.g., about 67.7° F.) should the water heater operate in the standby mode long enough (e.g., after about 20-30 minutes) during normal operation.

However, during abnormal operation such as when there is a leakage in the water heater as shown in FIG. 10, the temperature reading of the first temperature sensor 414 will increase (i.e., positive rate of change) again to a second peak or leakage temperature limit 690A after the water heater enters the standby mode from the heating mode. In particular, the temperature reading of the first temperature sensor 414 will increase to the leakage temperature limit 690A shortly after (e.g., about two minutes; at 526 minutes in FIG. 10) beginning to decrease in temperature from the maximum temperature limit 685A. Said another way, the first temperature sensor 414 is configured to detect a change in state of the rate of change after the water heater enters the standby mode from the heating mode. In the illustrated embodiment, the change in state of the rate of change is from a first, negative rate of change to a second, positive rate of change in the standby mode. The leakage temperature limit 690A may be proximate the maximum temperature limit 685A of the first temperature sensor 414. For example, the leakage temperature limit 690A is 83.0° F.

In particular, with reference to FIG. 10, when the water heater enters the standby mode after operating in the heating mode, and a leakage has occurred, the temperature reading of each of the first and third temperature sensors 414, 420 first has a negative rate of change. The rate of change is negative because the flue gases are no longer flowing to produce condensate, and a temperature of the water in the water heater begins to cool down, such that a temperature of the leaking water which is detected by both the first and third temperature sensors 414, 420 when the water heater is in standby mode also decreases in temperature. The water heater further includes a wait period 695 which is defined as the period of time when the water heater enters the standby mode from the heating mode, and the temperature reading of the first temperature sensor 414 detects a negative rate of change. The wait period 695 ends when the temperature reading of the first temperature sensor 414 detects a shift or change in state from the negative rate of change to the positive rate of change during the standby mode in which the temperature reading of the first temperature sensor 414 begins to increase toward the leakage temperature limit 690A. As illustrated in FIG. 10, during the wait period 695, a rate at which the temperature reading of the first temperature sensor 414 decreases is significantly higher compared to a rate at which the temperature reading of the third temperature sensor 420 decreases, even though both sensors 414, 420 are configured to detect a temperature of any leaking water.

The difference in the detected rates of temperature change during the wait period 695 is explained by the position of the first temperature sensor 414 being located downstream of the condensate management portion 400 (i.e., the drain pipe 394) such that the leaking water is inhibited from entering the drain line 398 to be detected by the first temperature sensor 414. Accordingly, during the wait period 695, the first temperature sensor 414 is not detecting a temperature of the leaking water or any condensate flowing through the drain line 398. Rather, the first temperature sensor 414 may be detecting a temperature of the residual condensate produced during the heating mode that has already begun to cool to a lower temperature (i.e., temperature lower than the leaking water) within the drain line 394. Therefore, the temperature reading of the first temperature sensor 414 during the wait period 695 decreases at a much higher rate of change and is notably lower (e.g., about 5° F. or more; closer to the temperature reading of the fourth temperature sensor 422 (e.g., 70.0° F.)) than the third temperature sensor 420.

The wait period 695 ends when the leaking water has reached a predetermined water level in the drain pipe 394, and the leaking water is then able to exit through the drain line 398 past the first temperature sensor 414. As such, the condensate management portion 400 is configured to delay the detection of the actual temperature of the leaking water by the first temperature sensor 414. This delay may facilitate a larger temperature change (i.e., exaggerate the temperature change) at the end of the wait period 695, thereby allowing the first temperature sensor 414 to more easily detect a change in state from a negative rate of change to a positive rate of change. Although the leaked water may lose some heat during the wait period 695 while accumulating in the drain pipe 394, this is not significant enough to prevent the change in state of the temperature reading from the negative rate of change to the positive rate or change, or to prevent the increase in the temperature reading of the first temperature sensor 414 toward the leakage temperature limit 690A.

Once the first temperature sensor 414 detects this change in state from the negative rate of change to the positive rate of change toward the leakage temperature limit 690A, the first temperature sensor 414 outputs a signal to the controller (e.g., controller 142). Subsequently, the controller is configured to determine that there is a leakage. Accordingly, in the embodiment of the water heater of FIGS. 9-11, only the first temperature sensor 414 is used to determine a leakage. Additionally, the wait period 695 facilitates detection by the controller of the change in state of the temperature reading of the first temperature sensor 414, and the determination that there is a leakage. Also, the controller may be configured to monitor a length of the wait period 695 over time such that the controller may also be configured to determine whether a leakage rate is changing. In particular, the length of wait period 695 changing with time is proportional to the change in leakage rate. Further, since any slight increase in the temperature reading of the first temperature sensor 414 at the end of the wait period 695 might indicate that there is a leak, the controller may be able to detect even smaller leaks.

The controller may be further configured to deactivate operation of the water heater once the leakage is determined, and indicate to a user that an error has occurred in the water heater. Accordingly, the embodiment of FIG. 9 represents another way that the temperature sensors may be positioned in a condensing water heater and used to determine a leakage in the water heater.

The control system 338 of the water heater may further include another temperature sensor 424 (FIG. 10) positioned within the heat exchanger (e.g., tank, heat exchanger coil, etc.) for detecting a temperature of the water within the water heater. In the illustrated embodiment, the temperature sensor 424 is positioned at a bottom of the tank close to a location where the flue gases exit the heat exchanger to the exhaust assembly 330. As shown in FIG. 10, the temperature of the water at the bottom of the tank remains around the same temperature of about 68.0° F. as the water heater operates between the heating mode and the standby mode. In other embodiments, the water heater may include other temperature sensors positioned at other locations within the water heater.

Figure 11:
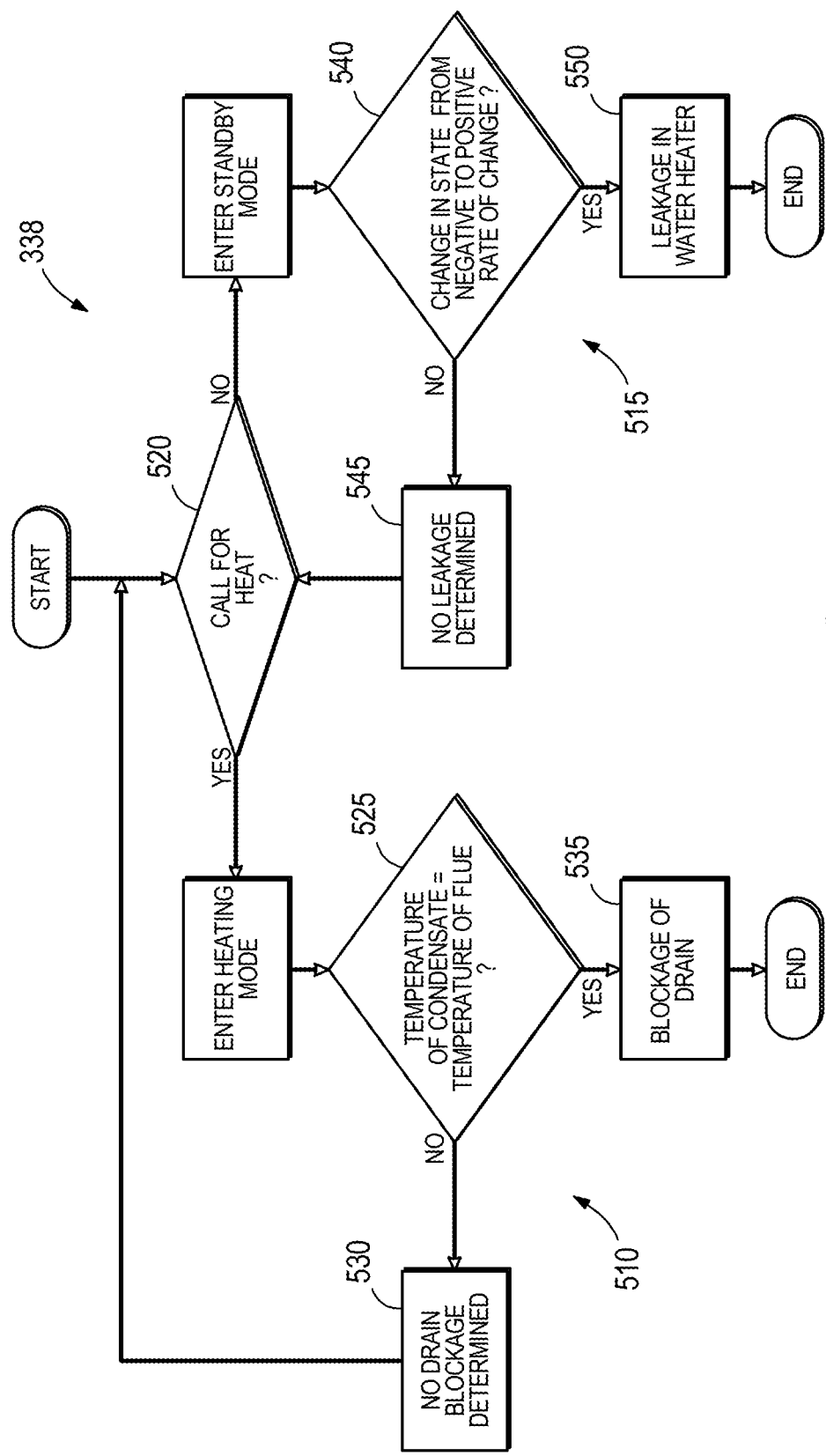
FIG. 11 is a flow diagram illustrating a control system of the water heater of FIG. 9, the control system configured to detect a water leakage and a drain blockage.

With reference to FIG. 11, similar to the control system 38 of the first embodiment of FIGS. 1-7, the control system 338, and specifically the controller, is programmed with two basic logic loops: a heating mode loop 510 and a standby mode loop 515. At decision point 520, the controller decides which loop to enter based on whether there is a call for heat. If there is a call for heat at decision point 520, the controller enters the heating mode loop 510 and if there is no call for heat, the controller enters the standby mode loop 515.

The heating mode loop 510 operates the same as the heating mode loop 210 as the first embodiment (FIG. 7), except the third temperature sensor 420 is used to detect the temperature of the condensate, and the second temperature sensor 418 is used to detect the temperature of the flue gases for determining whether there is a drain blockage. As such, the discussion of the heating mode loop 510 is not re-stated. Alternatively, the temperature readings of the first temperature sensor 414 during the heating mode may also be used to determine a drain blockage. In particular, when the temperature readings of the first temperature sensor 414 decrease toward the minimum temperature limit 682 during the heating mode, the controller will determine that there is a drain blockage.

In the standby mode loop 515, the controller queries the first temperature sensor 414 at decision point 540 to obtain the respective temperature of condensate in the drain line 398. Additionally, at decision point 540, the controller compares the temperature reading of the first temperature sensor 414 to previous temperature readings during the standby loop, and determines whether the temperature reading has changed in state from a negative rate of temperature change to a positive rate of temperature change. In the illustrated embodiment of the tank water heater, if there is a change in state, the controller determines at box 550 that there is leakage of water (from the tank. The controller thus concludes at 550 that there is leakage (i.e., leakage of water from the tank through the wall of the flue such that the hot water is flowing to the drain assembly 390 and through the drain line 398). If there is no change in state during the standby mode, the controller determines at box 545 that there is no leakage of water (from the tank).

Thus, the invention provides, among other things, a water heater 10 including a control system 38, 338 configured to detect an error in the water heater 10 such as a leakage or a drain blockage by utilizing and/or comparing temperature readings of condensate, flue gases, and outside atmosphere during specific operating modes of the water heater 10. Various features and advantages of the invention are set forth in the following claims.

What is claimed is:
1. A water heater system comprising:
a gas burner configured to selectively produce flue gases;
a heat exchanger for heating water in the water heater system, the heat exchanger configured to receive one of the water and the flue gases, wherein the water heater system is operable in a heating mode in which the flue gases are flowing through the water heater system to heat the water in the water heater system, and a standby mode in which there is an absence of the flue gases flowing through the water heater system;
an exhaust assembly in fluid communication with the heat exchanger, the exhaust assembly including a condensate collector configured to receive the flue gases and condensate produced by the flue gases, the condensate collector including a condensate management portion;
a temperature sensor positioned to sense a temperature of fluid within the condensate collector, the temperature sensor configured to detect a rate of temperature change of the fluid; and
a controller configured to determine the presence of a leak in the water heater system when the rate of temperature change transitions from a negative rate of change to a positive rate of change while the water heater system is in the standby mode after the water heater system was in the heating mode,
wherein the condensate management portion delays the transition of the rate of temperature change from the negative rate of change to the positive rate of change when the water heater system enters the standby mode from the heating mode.

2. The water heater of claim 1, wherein the condensate collector includes a drain line, and wherein the temperature sensor is positioned at least partially within the drain line.

3. The water heater of claim 2, wherein the fluid flowing from the heat exchanger toward the condensate collector defines a downstream direction, wherein the condensate collector includes a drain pipe fluidly connected to the drain line and positioned upstream of the drain line, and wherein the condensate management portion includes the drain pipe and a portion of the drain line upstream of the predetermined location of the temperature sensor.

4. The water heater of claim 2, wherein the condensate management portion includes an internal volume and delays the transition of the rate of temperature change by accumulating fluid within the internal volume.

5. The water heater of claim 4, wherein the transition of the rate of temperature change from the negative rate of change to the positive rate of change occurs once leaking water has reached a predetermined location within the internal volume.

6. The water heater of claim 1, wherein a length of time between the water heater system entering the stand-by mode and the transition of the rate of change from the negative state to the positive state is proportional to a leakage rate.

7. The water heater of claim 1 wherein the temperature sensor is a first temperature sensor, further comprising a second temperature sensor positioned to sense a temperature of the flue gases flowing through the exhaust assembly, the second temperature sensor electrically connected to the controller.

8. The water heater system of claim 7, wherein the condensate collector includes a drain, and wherein the controller is further configured to determine a drain blockage of the drain based on a comparison between a temperature reading of the first temperature sensor and a temperature reading of the second temperature sensor when the water heater is in the heating mode.

9. The water heater system of claim 8, wherein the drain blockage is determined by the controller when the temperature reading of the first temperature sensor is about the same as the temperature reading of the second temperature sensor.

10. The water heater system of claim 1, wherein the condensate management portion includes a drain pipe, and wherein water leaking from the water heater system accumulates in the drain pipe after the water heater system enters the standby mode from the heating mode.

11. A method for determining an error in a water heater system, the water heater system including a heat exchanger, a gas burner, and an exhaust assembly in fluid communication with the heat exchanger, the method comprising:
operating the water heater system in a heating mode, in which flue gases produced by the gas burner are flowing through the water heater system;
operating the water heater system in a standby mode, in which there is an absence of the flue gases flowing through the water heater system;
condensing water from the flue gases to form condensate when the water heater system is operating in the heating mode, and flowing the condensate through the exhaust assembly;
monitoring, by a controller, a rate of temperature change detected by a temperature sensor positioned to sense a temperature of fluid within a condensate collector of the exhaust assembly, the condensate collector having a condensate management portion;
determining a leakage of the water heater system by the controller when the rate of temperature change adjusts from a negative rate of change to a positive rate of change when the water heater system is in the standby mode after the water heater system was in the heating mode; and
delaying, by the condensate management portion, the adjustment of the rate of temperature change from the negative rate of change to the positive rate of change for a predetermined time period when the water heater enters the standby mode from the heating mode.

12. The method of claim 11, wherein the adjustment of the rate of temperature change from the negative rate of temperature change to the positive rate of temperature change occurs at an end of the predetermined time period.

13. The method of claim 11 wherein the temperature sensor is a first temperature sensor, wherein monitoring, by the controller, further includes monitoring a temperature reading of the first temperature sensor, and monitoring a temperature reading of a second temperature sensor positioned to sense a temperature of the flue gases flowing through the exhaust assembly.

14. The method of claim 13, wherein the condensate collector further includes a drain configured to receive the condensate, the method further comprising determining a drain blockage of the drain by the controller based on a comparison between the temperature reading of the first temperature sensor and the temperature reading of the second temperature sensor when the water heater is in the heating mode.

15. The method of claim 14, wherein the drain blockage is determined by the controller when the temperature reading of the first temperature sensor is about the same as the temperature reading of the second temperature sensor.

16. The method of claim 11, wherein the condensate collector includes a drain line, and wherein the temperature sensor is positioned at least partially within the drain line at a predetermined location on the drain line.

17. The method of claim 16, wherein the fluid flows from the heat exchanger through the exhaust assembly to define a downstream direction, wherein the condensate collector includes a drain pipe fluidly connected to the drain line upstream of the drain line, and wherein the condensate management portion includes the drain pipe and a portion of the drain line upstream of the predetermined location of the first temperature sensor.

18. The method of claim 16, wherein delaying, by the condensate management portion, further includes inhibiting flow of leaking water through the drain line, by the condensate management portion, during the predetermined time period.

19. The method of claim 11, wherein the condensate management portion includes a drain pipe, the method further comprising accumulating water leaking from the water heater system in the drain pipe during the predetermined time period.

* * * * *